(12) United States Patent
Luthra et al.

(10) Patent No.: US 8,964,768 B2
(45) Date of Patent: *Feb. 24, 2015

(54) VLAN NUMBERING IN ACCESS NETWORKS

(71) Applicant: Koninklijke KPN N.V., The Hague (NL)

(72) Inventors: Vinod Luthra, Zoetermeer (NL); Alexander Peter De Boer, Zoeterwoude (NL)

(73) Assignee: Koninklijke KPN N.V., The Hague (NL)

( * ) Notice: Subject to any disclaimer, the term of this patent is extended or adjusted under 35 U.S.C. 154(b) by 182 days.

This patent is subject to a terminal disclaimer.

(21) Appl. No.: 13/690,134

(22) Filed: Nov. 30, 2012

(65) Prior Publication Data

US 2013/0089108 A1   Apr. 11, 2013

Related U.S. Application Data

(63) Continuation of application No. 12/012,605, filed on Feb. 4, 2008, now Pat. No. 8,340,107.

(30) Foreign Application Priority Data

Feb. 5, 2007   (EP) .................................... 07002405

(51) Int. Cl.
| | | |
|---|---|---|
| H04L 12/28 | (2006.01) | |
| H04L 12/46 | (2006.01) | |
| H04L 12/66 | (2006.01) | |
| H04L 29/12 | (2006.01) | |
| H04L 12/24 | (2006.01) | |
| H04L 12/931 | (2013.01) | |

(52) U.S. Cl.
CPC ............ *H04L 12/4641* (2013.01); *H04L 12/66* (2013.01); *H04L 61/2596* (2013.01); *H04L 29/12207* (2013.01); *H04L 41/0806* (2013.01); *H04L 41/0889* (2013.01); *H04L 61/20* (2013.01); *H04L 49/20* (2013.01)
USPC ........................................................ 370/401

(58) Field of Classification Search
None
See application file for complete search history.

(56) References Cited

U.S. PATENT DOCUMENTS

| | | | |
|---|---|---|---|
| 6,252,888 B1 | 6/2001 | Fit, Jr. et al. | |
| 6,515,990 B1 | 2/2003 | Leung | |
| 6,813,250 B1 | 11/2004 | Fine et al. | |
| 6,901,452 B1 | 5/2005 | Bertagna | |
| 6,975,627 B1 | 12/2005 | Parry et al. | |
| 7,099,317 B2 | 8/2006 | Ambe et al. | |
| 7,272,137 B2 | 9/2007 | Unitt et al. | |
| 7,333,508 B2 | 2/2008 | Rabie et al. | |
| 7,636,360 B2 * | 12/2009 | Nagai et al. ................... 370/401 |
| 7,636,369 B2 | 12/2009 | Wong | |
| 8,085,790 B2 | 12/2011 | Klessig et al. | |
| 8,340,107 B2 * | 12/2012 | Luthra et al. ................. 370/401 |
| 2002/0018489 A1 | 2/2002 | Ambe et al. | |
| 2002/0087721 A1 | 7/2002 | Sato et al. | |
| 2002/0141389 A1 | 10/2002 | Fangman et al. | |
| 2003/0037163 A1 | 2/2003 | Kitada et al. | |
| 2003/0152075 A1 | 8/2003 | Hawthorne, III et al. | |
| 2003/0154259 A1 | 8/2003 | Lamberton et al. | |
| 2004/0081180 A1* | 4/2004 | De Silva et al. ............. 370/402 |
| 2004/0098501 A1 | 5/2004 | Finn | |
| 2004/0151120 A1* | 8/2004 | Shankar et al. ............... 370/249 |

(Continued)

*Primary Examiner* — Timothy J Weidner
(74) *Attorney, Agent, or Firm* — McDonnell Boehnen Hulbert & Berghoff LLP

(57) ABSTRACT

The invention relates to VLAN numbering in access networks.

5 Claims, 3 Drawing Sheets

(56) References Cited

U.S. PATENT DOCUMENTS

| | | |
|---|---|---|
| 2005/0138149 A1 | 6/2005 | Bhatia |
| 2005/0147094 A1 | 7/2005 | Malalur |
| 2005/0160174 A1* | 7/2005 | Ingmar et al. ............... 709/228 |
| 2005/0190788 A1 | 9/2005 | Wong et al. |
| 2006/0015643 A1 | 1/2006 | Orava et al. |
| 2006/0114915 A1 | 6/2006 | Kalkunte et al. |
| 2006/0245435 A1 | 11/2006 | Sajassi |
| 2006/0253530 A1* | 11/2006 | Wu et al. .................... 709/204 |
| 2007/0097639 A1* | 5/2007 | de Heer et al. ............... 361/697 |
| 2007/0140250 A1 | 6/2007 | McAllister et al. |
| 2007/0223399 A1 | 9/2007 | Yang et al. |
| 2008/0019385 A1* | 1/2008 | Sultan et al. ................. 370/401 |
| 2010/0322254 A1* | 12/2010 | Takacs ..................... 370/395.53 |
| 2010/0332615 A1 | 12/2010 | Short et al. |
| 2012/0014387 A1* | 1/2012 | Dunbar et al. ............ 370/395.53 |
| 2013/0089108 A1* | 4/2013 | Luthra et al. ................. 370/420 |
| 2013/0114608 A1* | 5/2013 | Luthra et al. ............ 370/395.53 |
| 2013/0114609 A1* | 5/2013 | Luthra et al. ............ 370/395.53 |

* cited by examiner

VLAN NUMBERING IN ACCESS NETWORKS

CROSS REFERENCE TO RELATED APPLICATIONS

The present application is a continuation of U.S. patent application Ser. No. 12/012,605, filed Feb. 4, 2008, entitled "VLAN Numbering in Access Networks," which claims priority to EP 07002405.4, filed Feb. 5, 2007, the entire contents of which are incorporated herein by reference.

FIELD OF THE INVENTION

The invention relates to VLAN numbering in access networks.

BACKGROUND OF THE INVENTION

It is known that access networks based on e.g., DSL or fiber, can be configured by network providers such, that subscribers are provided access to multiple service providers. In such a network configuration, all connected service providers are also provided access to all connected subscribers.

1. Problem Definition

In known configurations for access networks with multiple service providers, configuration and management of a multitude of service providers need to be performed per network terminator, i.e., for each subscriber the network terminator at the subscriber premises needs to be configured to allow access to each specific service provider from that premise. Further for each operational subscriber-service provider relation, administration needs to be maintained in the network terminator.

2. Aim of the Invention

The aim of the invention is to reduce the configuration and management efforts needed in configurations for access networks with multiple service providers.

SUMMARY OF THE INVENTION

The present invention provides a solution to reduce the configuration and management efforts needed for configuring access networks with multiple service providers. To this end, the current invention eliminates the need for configuring and managing the network terminator at the subscriber premises in order to allow the subscriber to access a service provider.

According to an aspect of the invention, a network terminator connected to an access network supports virtual local area network (VLAN) numbering on both the network side and the subscriber side. The network terminator connects both VLANs. The VLAN numbering on the network side comprises both port numbers and service numbers.

According to another aspect of the invention, the VLAN numbering on the network side is such that port numbers in VLAN numbers to one specific network terminator have a constant value for services from one specific service provider. The VLAN numbering on the subscriber side comprises service numbers and all services from one specific service provider are delivered to the subscriber through one specific physical port on the subscriber side.

According to a further aspect of the invention, the network terminator "strips" the port number from the VLAN numbering on the network side and delivers the services to the subscriber side through the physical port at subscriber side that corresponds with the stripped port number. In this direction towards the subscriber, the network terminator copies the VLAN numbers for the services delivered at the subscriber side from the corresponding VLAN service numbers at the network side.

In an opposite direction, the network terminator "adds" a port number to the VLAN numbering from the subscriber side and delivers the services at the network side, with a port number in the VLAN numbering that corresponds with the physical port number at the subscriber side. In this direction towards the network, the network terminator copies the service numbers from the subscriber side into the VLAN numbers on the network side. According to the invention, "stripping" means setting the bits of the port number part from the VLAN ID numbering (or VLAN tag) to zero. In the opposite direction, "adding" means setting the bits of the port number in the VLAN numbering on the network side to the value that corresponds with the physical port number at the subscriber side. The number of bits on network side and subscriber side of the network terminator is constant, preferably 12 bits.

According to yet another aspect of the invention, the network terminator supports VLANs on the network side and untagged Ethernet on the subscriber side of the device. The VLAN numbering on the network side has the same structure as explained above, but now one specific service number value is reserved to indicate a relation to untagged Ethernet traffic on the subscriber side of the device, i.e., when this specific service number value is used, the device will translate this traffic from the VLAN on the network side to untagged Ethernet traffic on the subscriber side, thereby stripping the VLAN tag entirely. According to the invention, for untagged Ethernet traffic in the direction from subscriber to network (service provider), the network terminator adds the specific service number value in the VLAN numbering on the network side.

According to an aspect of the invention, the specific service number value which indicates a relation to untagged Ethernet traffic on the subscriber side of the device is 1000 0000 (decimal 128) in the VLAN numbering on the network side of the device. In this case, all traffic that is to be transported using untagged Ethernet in the subscriber plan, is coded by the service provider with the service number in the VLAN tag set to 1000 0000 (decimal 128). When this translation from VLAN traffic to Ethernet traffic (and vice versa) is used, the usage of the port number in the VLAN numbering on the network side remains unchanged.

According to another aspect of the invention, the network terminator supports a division of the service numbers in the VLAN numbering.

According to yet another aspect of the invention, the service number blocks are used for traffic separation.

According to another aspect of the invention, traffic separation is used to distinguish between different classes of service.

According to another aspect of the invention, the device uses a different traffic queue for each class of service and each traffic queue is handled by the device with a different priority.

According to another aspect of the invention, the traffic queues are implemented in the upstream direction, i.e., the direction from subscriber to the network.

According to another aspect of the invention, the traffic queues are implemented in the downstream direction, i.e., the direction from network to subscriber.

BRIEF DESCRIPTION OF THE DRAWINGS

The invention will be explained in greater detail by reference to exemplary embodiments shown in the drawings, in which:

FIG. 2 shows network terminators connected to a multi-service provider network, wherein each network terminator is connected to a number of home gateways, residential gateways, settop boxes, voice over IP gateways and the like.

DETAILED DESCRIPTION OF THE INVENTION

For the purpose of teaching of the invention, preferred embodiments of a device according to the invention are described in the sequel. It will be apparent to the person skilled in the art that other alternative and equivalent embodiments of the invention can be conceived and reduced to practice, the scope of the invention being only limited by the claims as finally granted.

Figure 1:
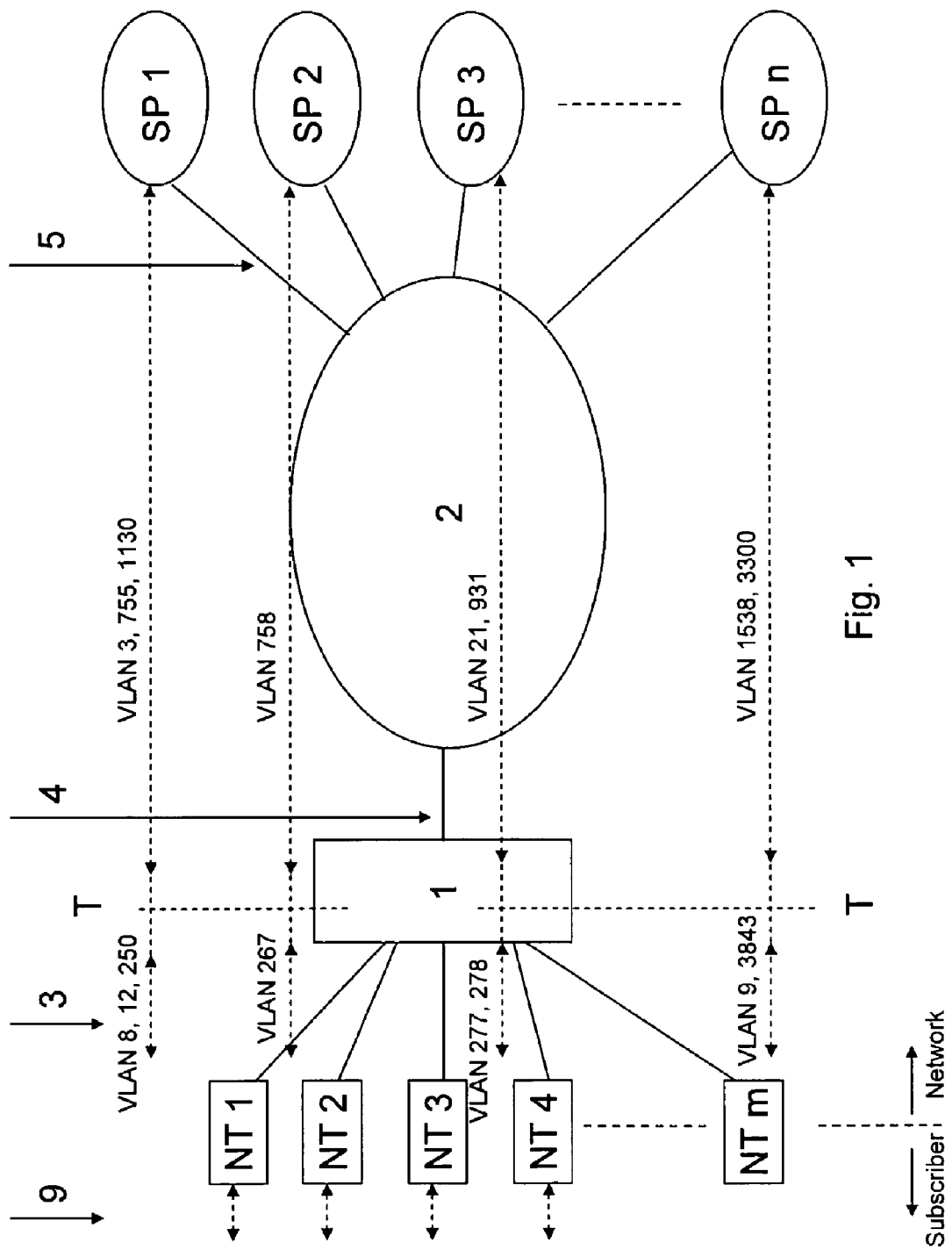
FIG. 1 shows network terminators connected to a multiple service multi-service provider network supporting virtual LANs.

The embodiment in FIG. 1 shows a number of network terminators connected to an access network supporting multiple service providers. VLANs are used to separate traffic from different service providers and to separate traffic belonging to different services from a single service provider. A multitude of service providers are shown on the right side as SP 1 . . . SP n. The service providers are connected to the core of the network 2 via the service provider access plane 5. In the direction of the subscribers, the network core 2 is connected via access plane 4 to a multitude of access multiplexers 1, such as a digital subscriber line access multiplexer or DSLAM (only one shown). The access multiplexer 1 connects to a multitude of network terminators NT 1 . . . NT m via an access plane 3. Access plane 3 in practice represents e.g., twisted pair cable, optical fiber or coaxial cable. Finally, the network terminator connects to home gateways, user devices and the like via subscriber plane 9, shown on the left side. Connectivity in subscriber plane 9, between network terminator and (user) devices etc. can be achieved by means of wired connections, such as twisted pair or coaxial cable, or wireless connections, such as wireless fidelity (WiFi), bluetooth or ultra wideband (UWB).

In the embodiment of FIG. 1, VLANs are used to facilitate communication between service providers and subscribers. In the core of the network, VLANs are used to separate traffic from different service providers and to separate traffic belonging to different services from a specific service provider. This is indicated by the dotted arrows between the service providers SP 1 . . . SP n and the access multiplexer 1. In the embodiment shown in FIG. 1, SP 1, e.g., offers 3 services for transport to subscribers, indicated by VLAN 3, VLAN 755 and VLAN 1130. For instance, VLAN 3 transports traffic belonging to a voice over IP service, VLAN 755 transports traffic belonging to an internet service and VLAN 1130 transports traffic belonging to an IP TV service. Mutatis mutandis, SP 2 offers one service via 1 VLAN and SP 3 and SP n offer 2 services via 2 VLANs. This is further illustrated in FIG. 2, which shows a number of network terminators NT 1 . . . NT 3, that deliver multiple services 11 . . . 13 to a number of subscribers. For each different service, a different home gateway, residential gateway, settop box, voice over IP gateway or the like may be employed. This is indicated by 6, 7 and 8, each representing a different type of home gateway. In subscriber plane 9 communication can also be based on VLANs. In this case, translation of VLAN numbering between subscriber side and network side is performed by the network terminator and specifically through VLAN Numbering Translator 20. In this case the service numbers on network side and subscriber side of the network terminator for a specific service relation between a subscriber and a service provider are the same. This will be explained further below. However, also untagged Ethernet may be used for communication in the subscriber plane 9. In that case no VLAN tag is used in the subscriber plane. The network terminator in that case translates untagged Ethernet traffic from the subscriber plane to VLAN traffic on the network side with a specific service number reserved to indicate untagged Ethernet traffic in the subscriber plane. In this case the usage of the port number in the VLAN numbering is the same as in the case of translation to VLAN traffic in the subscriber plane, i.e., the port number on the network side corresponds with the physical port number on the subscriber side through which the traffic is delivered to the subscriber.

Figure 2:
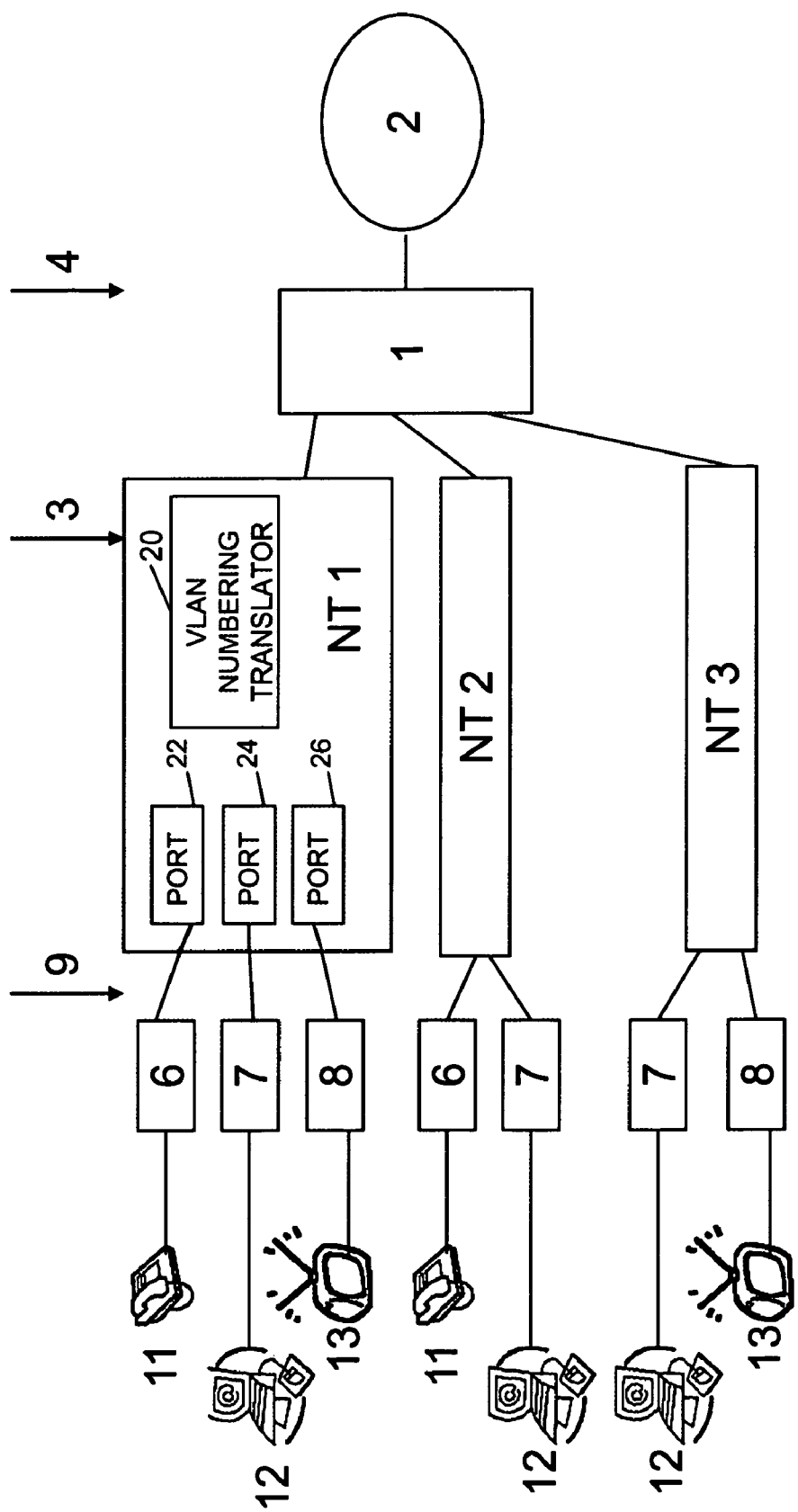

Each service delivered to the subscriber may originate from a different service provider. In this case, according to the invention, each home gateway is connected to a different physical port on the subscriber side. The physical ports for network terminator NT 1 are specifically shown as ports 22, 24 and 26 all as shown in FIG. 2. On the other hand, two or more different services delivered to the subscriber may originate from one service provider. In this case, two or more home gateways are connected to the same physical port on the subscriber side. Inasmuch as all the network terminators NT 1, . . . , NT m are identical in structure and overall functionality, then to simplify the drawings, the relevant constituent components of only terminator NT 1 are illustrated in FIG. 2.

The physical interface between the network terminator and the home gateway, set-top box, etc. can e.g., be Ethernet, WiFi, Bluetooth and the like.

According to the embodiment in FIG. 1, the access multiplexer 1 translates the VLAN numbers from the core network to VLAN numbers in the access plane 3. For each VLAN number from a specific service provider on the core network, a unique corresponding VLAN number in access plane 3 exists. This leads to the same total number of VLAN numbers in access plane 3 and the core network. This kind of VLAN number translation (indicated by T) is known to commonly skilled persons and therefore need not be explained in detail here.

Figure 3:
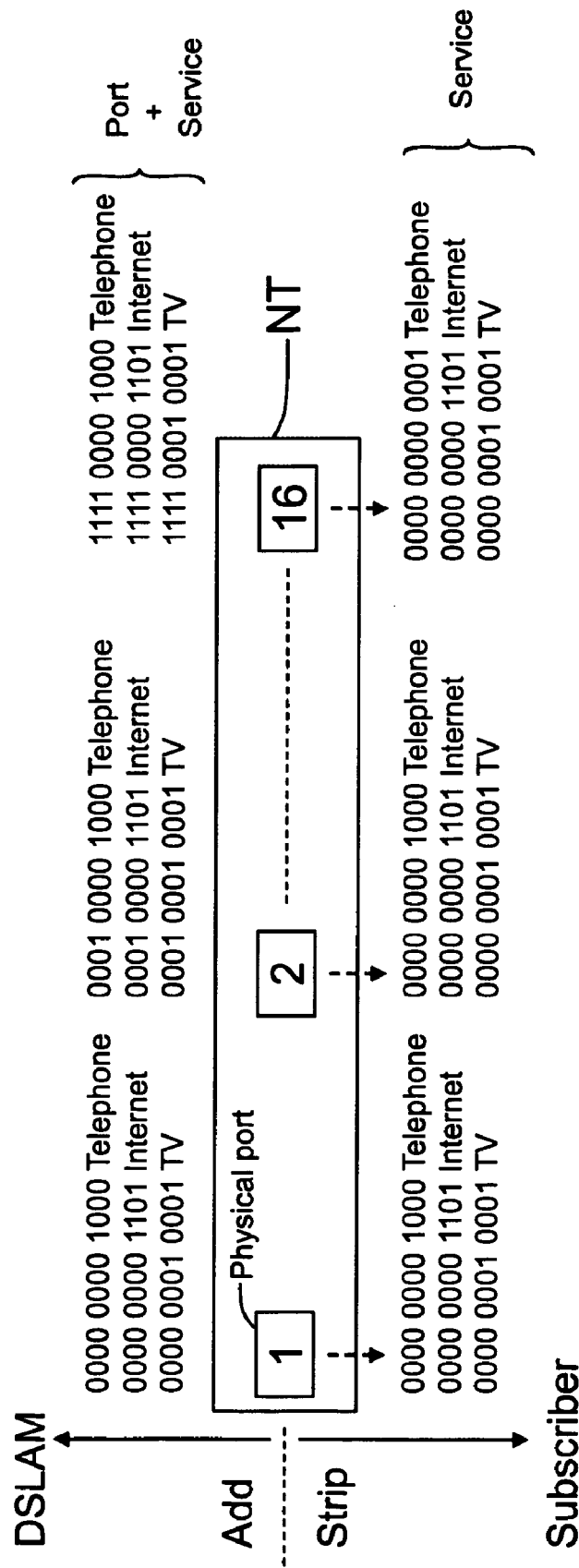
FIG. 3 shows the relation between the physical ports of a network terminator and the virtual LAN numbering on the network side and the subscriber side.

The invention is further explained with the aid of FIG. 3, which shows the relation between the physical ports of a network terminator and the virtual LAN numbering on the network side and the subscriber side, i.e., the translation operation provided by VLAN Numbering Translator 20 shown in FIG. 2.

As shown in FIG. 3, each physical port or port number on the subscriber side of the network terminator has a relation to a specific port number in the VLAN numbering on the network side of the network terminator. On the subscriber side, the VLAN numbers (or VLAN tags) contain service numbers (port number set to zero). The service numbers for a specific physical port on the subscriber side, are the same as the service numbers combined with the corresponding port number in the VLAN numbering on the network side. On the network side the VLAN numbers (or tags) contain port numbers and service numbers.

We claim:

1. A network terminating device adapted for use in an access network, the network supporting virtual local area networks (VLANs) on a network side of the device and untagged Ethernet on a subscriber side of the device, wherein:

in the access network, different services from different ones of service providers are delivered to the subscriber as VLAN traffic over the network flowing to the subscriber, the VLAN traffic being delivered as untagged Ethernet traffic through one or more physical ports on the device to the subscriber; and the VLANs separate the VLAN traffic from the different service providers, each of the VLANs on the network side having an associated VLAN numbering with the VLAN numbering comprising a port number part comprising a port number and a service number part comprising a service number differentiating the different services provided by at least one of the service providers;

the device comprising:

means for translating between the untagged Ethernet traffic on the subscriber side and the VLAN traffic on the network side by setting the service number in the service number part of the VLAN numbering in the VLAN traffic on the network side to a specific service value that indicates a relation to the untagged Ethernet traffic on the subscriber side and setting the port number in the port number part to a given port number, wherein the given port number corresponds with a particular physical port through which the services are to be delivered to the subscriber side, so as to define VLAN numbering on the network side.

2. The network terminating device recited in claim 1 wherein the specific service value corresponds to decimal 128.

3. The network terminating device recited in claim 1 wherein the port number and the service number have a numerical bit structure, and the specific service value is binary 1000 0000.

4. An access network having network and subscriber sides, which supports virtual local area networks (VLANs) on the network side and untagged Ethernet on the subscriber side, wherein different services from different service providers are delivered to the subscriber as VLAN traffic flowing over the network and are delivered as untagged Ethernet traffic through one or more physical ports on the subscriber side to the subscriber, the network comprising:

a plurality of VLANs for separating the VLAN traffic from the different service providers, each of the VLANs on the network side having an associated VLAN numbering with the VLAN numbering comprising a port number part comprising a port number and a service number part comprising a service number differentiating the different services provided by at least one of the service providers; and a network terminating device, connected to the VLANs in the network side, the device comprising:

means for translating between the untagged Ethernet traffic on the subscriber side and the VLAN traffic on the network side by setting the service number in the service number part of the VLAN numbering in the VLAN traffic on the network side to a specific service value that indicates a relation to the untagged Ethernet traffic on the subscriber side and setting the port number in the port number part to a given port number, wherein the given port number corresponds with a particular physical port through which the services are to be delivered to the subscriber side, so as to define VLAN numbering on the network side.

5. A method for facilitating communication between service providers and a subscriber in a multiple service provider access network, the network having network and subscriber sides and supporting virtual local area networks (VLANs) on the network side and untagged Ethernet on the subscriber side, the method comprising:

providing different services from different ones of the service providers to the subscriber as VLAN traffic flowing over the network and delivered as untagged Ethernet traffic through one or more physical ports on the subscriber side;

separating, through a plurality of VLANs, the VLAN traffic from the different service providers, each of the VLANs on the network side having an associated VLAN numbering with the VLAN numbering comprising a port number part comprising a port number and a service number part comprising a service number differentiating the different services provided by at least one of the service providers; and translating between the untagged Ethernet traffic on the subscriber side and the VLAN traffic on the network side by setting the service number in the service part of the VLAN numbering in the VLAN traffic on the network side to a specific service value that indicates a relation to the untagged Ethernet traffic on the subscriber side and setting the port number in the port number part to a given port number, wherein the given port number corresponds with a particular physical port through which the services are to be delivered to the subscriber side, so as to define VLAN numbering on the network side.

* * * * *